(12) United States Patent
Hyer et al.

(10) Patent No.: US 9,273,228 B1
(45) Date of Patent: Mar. 1, 2016

(54) ROOF COATING COMPOSITION

(71) Applicants: Raymond Hyer, Tampa, FL (US); Donald Portfolio, Tampa, FL (US)

(72) Inventors: Raymond Hyer, Tampa, FL (US); Donald Portfolio, Tampa, FL (US)

(73) Assignee: Gardner Asphalt Corporation, Tampa, FL (US)

( * ) Notice: Subject to any disclaimer, the term of this patent is extended or adjusted under 35 U.S.C. 154(b) by 610 days.

(21) Appl. No.: 13/650,773

(22) Filed: Oct. 12, 2012

(51) Int. Cl.
*C09D 195/00* (2006.01)
*C09J 195/00* (2006.01)

(52) U.S. Cl.
CPC ............. *C09D 195/00* (2013.01); *C09J 195/00* (2013.01)

(58) Field of Classification Search
CPC . Y02W 30/58; C09D 195/00; C09D 195/005; C09D 7/1275; C09D 7/1283; C09J 195/00; C09J 195/005; C08K 2201/005; C08K 11/005
See application file for complete search history.

(56) References Cited

U.S. PATENT DOCUMENTS

| | | | |
|---|---|---|---|
| 2,368,371 A | 1/1945 | Minge | |
| 4,222,851 A | 9/1980 | Good | |
| 4,477,250 A | 10/1984 | Brashears | |
| 4,706,893 A | 11/1987 | Brock | |
| 5,098,025 A * | 3/1992 | Drouin et al. | 241/21 |
| 5,236,497 A | 8/1993 | Grzybowski | |
| 5,337,965 A | 8/1994 | Chiovitti | |
| 5,385,426 A * | 1/1995 | Omann | 404/75 |
| 5,626,659 A | 5/1997 | Chivers | |
| 5,848,755 A | 12/1998 | Zickell | |
| 5,938,130 A | 8/1999 | Zickell | |
| 6,039,914 A | 3/2000 | Gehrke | |
| 6,120,838 A | 9/2000 | Zickell | |
| 6,228,503 B1 | 5/2001 | Zickell | |
| 6,290,152 B1 * | 9/2001 | Zickell | 241/21 |
| 6,616,743 B1 | 9/2003 | Yap | |
| 7,297,301 B1 | 11/2007 | Deschamps | |
| 2010/0064937 A1 | 3/2010 | Harmon | |
| 2011/0049275 A1 | 3/2011 | Zickell | |
| 2011/0266381 A1 | 11/2011 | Harmon | |
| 2013/0199410 A1 * | 8/2013 | Maldonado et al. | 106/281.1 |
| 2014/0014000 A1 * | 1/2014 | Franzen et al. | 106/273.1 |

OTHER PUBLICATIONS

Rotochopper RG-1 Shingle Grinder; Rotochopper, Inc, 217 West Street, PO Box 295, St. Martin, MN 56376, 320-548-3586; www.rotochopper.com (2012).*

Rotochopper RG-1 Shingle Grinder; Rotochopper, Inc, 217 West Street, PO Box 295, St. Martin, MN 56376, 320-548-3586; www.rotochopper.com.

* cited by examiner

*Primary Examiner* — David M Brunsman
(74) *Attorney, Agent, or Firm* — Traverse Legal, PLC

(57) ABSTRACT

What is provided are compositions of matter and methods for making compositions of matter, which comprise liquid roof coating products and/or roof cement products comprising recycled scrap asphalt shingle that is dry processed without adding heat or liquid into particles substantially within the range of 10-40 mesh size, and which are post added to a liquid mixture to compose a roof coating and/or roof cement product.

95 Claims, No Drawings

ROOF COATING COMPOSITION

FIELD

This patent application relates to liquid roof coatings that may be applied to a roof, wall or foundation surface.

BACKGROUND

Roof coatings may be used to add a layer of protection to a roof or one or more roof surfaces, such as to provide protection from various elements, which may act to penetrate or erode a roofing surface. Roofing coatings may serve as moisture barriers, UV ray barriers, thermal barriers, wind barriers, or other protection barriers to reduce or eliminate penetration by an element into or through one or more roofing surfaces.

Liquid roof coatings may be applied over a roofing surface by application techniques such as spray, brushed on, and/or roller application. Roofing surfaces may commonly be composed of asphalt shingles, aluminum, steel or other metal materials, asphalt membranes, polymer modified asphalt membranes or other roofing materials. A roof coating may be applied over the roofing surface one or more times to add additional barrier protection to the roofing surface.

Asphalt roof coatings are known. Asphalt cutback is a desirable material in a roof coating because it may be applied cold so as not to require work with hot material in the application. However, virgin asphalt can be costly. Using recycled asphalt materials, such as scrap asphalt shingles, as a replacement for part of the virgin asphalt in a roof coating could be beneficial in that the scrap materials are less costly and may improve performance. Employing recycled scrap asphalt shingle materials is also beneficial in that the non-asphalt components of the scrap shingles, such as but not limited to, limestone, granules and glass fiber, may act as fillers in a roof coating product and reduce or eliminate the need to add other fillers to a roof coating composition of matter. The glass fiber may also add some reinforcing qualities to the roof coating. However, the scrap shingles must be processed or ground into a small enough size to be capable of being suspended in a roof coating product, such as approximately 20-40 mesh or smaller.

Prior attempts to salvage asphalt in recycled materials have been cost prohibitive, requiring many processing steps and costly machinery, and have often attempted to recover the asphalt in pure form, which has required separating it from other materials in the recycled scrap, again making the process complicated and costly. Some methods require wet processing the scrap shingle in a liquid and/or by applying heat. Other methods have included use of hammer mills, but have produced scrap asphalt that is not of a sufficiently small size to be suitable for a roof coating application, and which is instead suitable primarily for paving products. There has been lacking in the art a method of dry processing recycled scrap asphalt shingle to a size sufficiently small for roof coating applications without heating or significant cooling.

For example, U.S. Pat. No. 4,222,851 to Good teaches a method of recovering asphalt and other materials from scrap shingles by solvent extraction. Good '851 teaches that a hammer mill is used to grind the scrap shingles to a 3"×3" size and then liquid solvents are applied with heat to chemically reclaim asphalt in the shingles. Good '851 does not teach a dry processing method resulting in ground shingle powder of a sufficiently small size to be suitable for a roof coating, nor any roof coating products.

Asphalt shingles have been recycled into pavement products. U.S. Pat. No. 4,706,893 to Brock teaches a hammer mill that grinds recycled asphalt shingles to a size of ¼ inch or ⅛ inch. They are heated to melt the asphalt contained therein. Liquid asphalt is added to the heated particles after they are ground. However, there is lacking a method of processing recycled asphalt shingles without adding liquid asphalt to them or heating them, and there is lacking a resulting ground product of a sufficiently small mesh size to be suitable for a roofing coating.

U.S. Pat. No. 5,236,497 to Grzybowski teaches a solid cold patch roadway repair product having recycled scrap asphalt shingle added as a minor additive to the composition. However, Grzybowski does not teach a roof coating product, nor does it teach a process by which recycled scrap shingle is ground.

U.S. Pat. No. 5,385,426 to Omann teaches a two hammer mill apparatus for recycling scrap asphalt shingle into a paving product. The shingle may be sprayed with water prior to entering the first hammer mill and also within the hammer mill. The water must later be removed by heating. The resulting product is not of sufficiently small size to be suitable for a roof coating product.

Attempts have been made to incorporate recycled scrap asphalt materials into roofing surface products. Most shingles are suitable, once ground, to incorporate into roof coatings. Size matters as if it is too large, small lumps are evident in the roofing product, which are not desirable.

U.S. Pat. No. 6,290,152 to Zickell teaches a method of recycling asphalt based material by heating it in a mill. Zickell '152 teaches that the recycled shingle is wet processed in a ball mill. Zickell '152 teaches that the scrap asphalt product, such as shingle, is simultaneously heated and milled in a heated milling apparatus in liquid to reduce the asphalt material including granules to a fine mesh in suspension in liquid asphalt. The milling apparatus has rods or paddles to pull the recycled asphalt under and into the liquid slurry, and a filter apparatus for filtering reduced asphalt and removing foreign objects therefrom. Although Zickell '152 claims to produce particles of a sufficiently small size for roofing surface applications, it requires heat and wet processing. It also teaches that pure asphalt and/or solvents are added to the recycled materials prior to milling: virgin, non-oxidized asphalt, aromatic rich asphalt, flux asphalt, solvents, oil or a combination of any of these is added to the recycled mixture to rejuvenate the mixture of recycled asphalt and to keep it liquid during processing. There is lacking a method and apparatus for dry processing scrap asphalt materials for a roof coating product. There is lacking in the art a process for processing scrap asphalt materials for a roof coating without adding pure asphalt and/or solvents to the recycled materials in the milling.

Similarly, U.S. Pat. No. 5,098,025 to Drouin teaches processing scrap asphalt shingle in a liquid mixture to grind it to about a 10 mesh particle size and using the wet paste mixture containing ground asphalt and/or other ground materials from the recycled shingles (such as rock or glass), in solid paving or roofing products. Drouin teaches that liquid in the slurry mixture acts to separate asphalt and other particles. Drouin teaches that the shingles are processed wet by grinding them with liquid (water or a solvent) to prevent the particles from heating and clumping together. However, Drouin teaches away from a dry powder product made with dry processing from recycled scrap shingles, and states that dry processing creates too much heat and particle clumping, which is solved by its wet processing.

U.S. Pat. No. 6,228,503 to Zickell teaches a roll roofing surface material made in part of recycled scrap shingles. However, Zickell '503 teaches that flux asphalt must be added to the reclaimed materials to achieve requisite viscosity to allow for pumping. The recycled materials are reclaimed by using the process of U.S. Pat. No. 5,848,755 to Zickell, which reclaims asphalt in liquefied form and shreds them in a ball mill to 250-300 mesh size during this wet processing. There is lacking a method and apparatus for dry processing scrap asphalt materials for a roof coating product. There is lacking in the art a process for processing scrap asphalt materials for a roof coating without adding pure asphalt to the recycled materials in the milling.

Harmon US2010/0064937 teaches a method of recycling scrap asphalt shingle in a single hammer mill process requiring heat to be added to the material for processing. The material is heated and liquefied to produce a slurry that can be formed into a finished product.

SUMMARY

What is provided are compositions of matter and methods for making compositions of matter, which comprise liquid roof coating products and/or roof cement products comprising recycled scrap asphalt shingle that is dry processed without adding heat or liquid into particles substantially within the range of 10-40 mesh size, and which are post added to a liquid mixture to compose a roof coating and/or roof cement product.

DETAILED DESCRIPTION

In the following detailed description, numerous specific details are set forth in order to provide a thorough understanding of the invention as defined in the claimed subject matter, and as an example of how to make and use the invention. However, it will be understood by those skilled in the art that claimed subject matter is not intended to be limited to such specific details, and may even be practiced without requiring such specific details. In other instances, well-known methods, procedures, and components have not been described in detail so as not to obscure the invention defined by the claimed subject matter.

What is provided is a roof coating product composition of matter comprised of scrap asphalt shingle and method of making same. The scrap asphalt shingle is dry ground and/or processed into a dry powder. The powder then may be added to a liquid cutback or emulsion mixture to form a liquid roof coating.

The scrap asphalt shingle may be recycled by grinding or sizing it in a grinding or milling apparatus, such as a double hammer mill. Other grinding techniques and single hammer mills may also be used to grind or size the asphalt scrap shingle into a dry powder. In one or more embodiments, the recycled scrap asphalt shingle may be ground into a 10 mesh size or smaller.

The recycled scrap shingle may include post-consumer product taken from a roof and recycled into the formulations discussed herein. The recycled scrap shingle may include scrap non-post-consumer product from a shingle maker, such as scrap from a shingle manufacturing factory that has never been applied to a roof. Combinations of post-consumer and non-post-consumer product may be recycled into one or more formulations.

In one or more embodiments, a double hammer mill may be used to grind up the scrap shingles into a powder. The material may be processed in a first chamber of a double hammer mill, to reduce it to smaller pieces. A screen may be located between the first and second chambers of the double hammer mill, so as to allow only pieces of a smaller size into the second chamber. Pieces that are too large continue to be struck by the hammers of the first chamber until reaching a size capable of moving through the screen into the second chamber. For example, the screen of the first chamber may be a 3/16 inch size. The hammers may be located in a rotating cylinder and consist of approximately half inch wide pieces of metal. Other sizes and configurations of hammers are possible. In the second chamber, further hammers may grind the pieces into smaller sizes and into a powder. There may be a screen at the bottom of the second chamber, similar to the first or with a smaller mesh size, where only particles of sufficiently small size are capable of falling out of the chamber through the screen, and the remaining particles are struck by the hammers in the second chamber until they are of sufficiently small size. For example, the screen of the second chamber may be a 1/8 inch size. The method may also include use of pre-sizing from another process to cut the scrap shingles into small pieces before putting them into the double hammer mill.

In the double hammer mill processing method of one or more embodiments, water is not mixed with the scrap shingle while it is being ground and/or processed in the double hammer mill. Solvent is not mixed with the scrap shingle while being ground and/or processed in the double hammer mill. It does not employ solvent or other chemicals to extract the asphalt from the scrap shingle.

In one or more processing embodiments, the ground scrap shingle is cooled using air. This air is pulled from the upper mill to the lower mill and through the exit using a blower to provide the vacuum and a cyclone to catch the dust. In one or more processing embodiments, the ground scrap shingle may be cooled using a diminimus amount of water, sprayed into the chamber between the upper mill and lower mill, which results in a dry product having a moisture content approximately the same as the ambient moisture content of scrap asphalt shingle at a typical outside temperature during summer months. For example, the ground scrap shingle may have a 3-5% moisture content, which is akin to the ambient moisture content in scrap asphalt shingle at a typical outside temperature during summer months. A mist of water can also be applied to the outside of the chamber between the upper and lower mill. Typical outside temperature during summer months may range, for example, from 80-100° F. Claimed subject matter is not intended to be so limited.

In one or more embodiments, the scrap shingle may be ground dry into a powder having approximately a fineness of 10 mesh, for a cutback or asphalt emulsion product. In one or more embodiments, the ground recycled scrap shingle may be 98 percent passing a 20 mesh [−20 mesh] (screen size 0.0331 in or 0.841 mm). Claimed subject matter is not intended to be so limited.

One or more roof emulsion coating composition of matter embodiments may be created with the recycled scrap asphalt shingles ground into a powder of 98 percent −20 mesh (screen size 0.0331 in or 0.841 mm). For example, asphalt emulsion products including, but not limited to, non-fibered asphalt emulsion coating, fibered asphalt emulsion coating, asphalt driveway sealer, and aluminum pigmented asphalt emulsion coating, may be created. One or more cutback roof coating composition of matter embodiments may be created with the recycled scrap asphalt shingles ground into a powder of 98 percent −20 mesh (screen size 0.0331 in or 0.841 mm). For example, asphalt cutback products including, but not limited to, a fibered asphalt coating, non-fibered asphalt coating, asphalt cement, fibered aluminum pigmented asphalt coating and non-fibered aluminum pigmented asphalt coating, may be formulated. Both the asphalt cutback and asphalt emulsion may form a vehicle and "resin" to compound specific products for use in a roof coating, such as but not limited to, for repair, adhesive, waterproofing and damp proofing applications.

Asphalt based coatings, adhesives and cements start with asphalt (a solid or semi-solid at room temperature) dissolved in mineral spirits, which may also be known as petroleum naphtha, solvent naphtha, VM&P naphtha, and aromatic naphtha; the differences are related to the proportion of various similar components) to make a cutback. This is an asphalt cut back with a solvent. The cutback may vary in the amount of solvent used, but generally, it may be about 30 percent in some embodiments.

Roof coatings and adhesives may be formed as cutback products, or they may be made to have a higher viscosity by adding clay (attagel and others, by way of example), a surfactant (such as PA-14) and cellulose fiber. These products may be applied by brushing, rolling or using high pressure airless spray and usually heat.

In various embodiments, roof adhesive compositions may include a solvent capable of dissolving the roof coating into a liquid at one or more room temperatures, such as but not limited to, PA-14 Acetate; a suspension agent or thickener capable of suspending fibers in an asphalt cutback product, such as but not limited to, Attagel® 15; one or more cellulose fibers; and/or an asphalt cutback, in addition to recycled scrap asphalt shingles.

Roof cements are mastic products, which are applied with a trowel. These products generally contain a surfactant, clay and cellulose fiber, but contain more fiber to increase the viscosity to a mastic consistency. Roof cements may have different amounts of water in various embodiments, including high water content.

Aluminum roof coatings are another group of products. They may be made with either cutback or an asphalt emulsion to make the products water based. The two types of product use two different types of aluminum pigment to manufacture.

Aluminum roof coating composition embodiments may include an aluminum paste. Aluminum roof coatings may contain a bonding agent. Bonding agents may have adhesive properties capable of bonding composition components. Bonding agents may act as a viscosity modifier. An example of a bonding agent is Tylose, but other bonding agents are possible. Various aluminum roof coating composition embodiments may include a rubber solution, such as but not limited to, a H 108 rubber solution. This is not required.

Aluminum roof coatings may also contain one or more thickeners, such as but not limited to, one or more acrylic thickeners, such as Acrysol ASE-94NP. Various fibers in aluminum roof coating product embodiments may include, but are not limited to, cellulose fibers, silica fibers (such as Imsil Silica), and the like. A thickener may serve as a viscosity modifier. Fibers may adjust the body of the composition, and impact how the material handles on brushes or other applicators, as well as, how it is applied to a roof surface. An acrylic thickener may be used instead of a fiber material in some compositions. One or more embodiments of an aluminum roof coating may include an insulator, such as but not limited to a perlite based product such as Harborlite® Perlite. Perlite is a substance made from volcanic rock and may serve, at least in part, to make a composition lighter. It is inorganic and has glassy properties. It may act at least in part to aid in material suspension within a composition, to assist in reducing and/or preventing material from settling or becoming packed in the mixture.

Various aluminum roof coating embodiments, such as water base embodiments, may include a material used to absorb moisture, such as but not limited to a micro-absorb product, by way of example. A micro-absorb material may act as a moisture scavenger.

A solvent based aluminum roof coating product may include an asphalt cutback, further modified by solvent and various other composition components. The solvent may act as a drying agent and/or cut viscosity of the cutback product.

Typically, the aluminum may be in a paste form when used in a roof coating. Depending upon the amount of aluminum in the composition, the composition may possess more or less brightness. An aluminum paste used in a solvent based composition may be a different formula from that used in a water based mixture. In a solvent based mixture the aluminum paste may cause the aluminum to float in the mixture, so as to lessen the amount of Hydrogen gas that may otherwise form in the mixture.

In asphalt emulsions, to prevent microbial growth, an anti-microbial may also be included, such as but not limited to, Mergal or similar (Proxel, Myacide. Canguard, or Dowicil). This may also be used in high water content asphalt cements.

Different sources of shingle scrap may be used in various embodiments, such as but not limited to tear-off shingles, shingle manufacturing plant scrap, or shingle seconds. Generally, using various sources for scrap shingle results in minor differences in the scrap in terms of size distribution, function and effect on the products. Cutback or some fiber may generally be substituted for some shingle scrap in some embodiments, ie. add 5% shingle scrap, subtract 5% cutback. Claimed subject matter is not intended to be so limited.

Emulsion Roof Coating Composition Examples

One or more emulsion ground scrap asphalt shingle roof coating products may include an asphalt emulsion roof coating liquid mixture, to which the ground scrap shingle may be added, which may contain: an acid, such as but not limited to chromic acid; a stabilizer, such as but not limited to bentonite and/or spinks clay; water and anti-microbial agents, such as but not limited to Mergal. The use of emulsifiers and emulsion stabilizers is to emulsify and stabilize the composition of matter. Anti-microbial agents may be used to reduce and/or prevent the growth of micro-organisms such as bacterial, algae, fungi and others from growing in the water medium of an emulsion.

Other materials that may be included in the ground scrap asphalt shingle emulsion roof coating in various embodiments, depending on the use, include fibers, which may be cellulose fibers such as, but not limited to, AFT fibers. Fibers may act to reinforce the emulsion and modify the viscosity. One or more embodiments of the ground scrap asphalt shingle roof coating compositions may also include thixotropic agents/modifiers, such as but not limited to, bentonite and other clays, hydroxyl-ethyl cellulose, amine salts, acrylic and/or others. Thixotropic agents or modifiers may be used in the roof coating composition to adjust the viscosity.

One or more embodiments of the ground scrap asphalt shingle roof coating emulsion composition may also include one or more filler materials, such as but not limited to, ground limestone, or sand. Sand may be used as a traction modifier for driveway sealer applications of the composition.

One or more embodiments of the roof coating emulsions may also include a colorant, such as carbon black to add a black color to the product, or aluminum pigment for aluminum roof coatings.

One or more embodiments of the roof coating emulsion composition may also include a polymer latex to improve coating properties such as drying time or wear resistance. For example, acrylic, styrene acrylic or neoprene latex polymers may be used in asphalt emulsions or styrene-butadiene-styrene (SBS) or styrene butylenes (SB) polymers in emulsion coatings.

In various embodiments, the resulting emulsion roof coating mixture may be liquid at room temperatures. Once processed into a powder, the dry ground scrap asphalt shingle powder is placed directly into the liquid emulsion roof coating mixture. In various embodiments, it is post added to the emulsion coating product, rather than emulsified in the mixture.

An example asphalt emulsion with RAS fibered and non-fibered roof coating composition of matter may include:

| Asphalt Emulsion | Range % by Wt. | |
| --- | --- | --- |
| Asphalt | 30.0 | 50.0 |
| Water | 40.0 | 55.0 |
| Bentonite Clay | 1.0 | 5.0 |
| Chromic | 0.1 | 0.5 |
| Spinks Clay | 5.0 | 20.0 |
| Mergal (anti-microbial) | 0.1 | 0.5 |
| RAS | 0.0 | 20.0 |
| AFT Fiber | 0.0 | 4.0 |

As used herein, "RAS" denotes recycled asphalt shingles.

An example asphalt emulsion based pavement sealer composition of matter with RAS may include:

| Pavement Sealer | Range % by Wt. | |
| --- | --- | --- |
| 9% Bentonite Slurry | 2 | 15 |
| Asphalt Emulsion (44%) | 25 | 45 |
| Spinks Slurry | 5 | 20 |
| Mergal 165 | 0.01 | 0.25 |
| Sand | 10 | 25 |
| Permablack | 0.5 | 5 |
| RAS | 5 | 35 |
| Busperse 39 | 0.01 | 0.5 |

An example asphalt emulsion based pavement sealer composition of matter with RAS may include:

| Pavement Sealer | Range % by Wt. | |
| --- | --- | --- |
| Clay | 10 | 20 |
| Water | 12 | 30 |
| Asphalt | 12 | 30 |
| Black | 1 | 5 |
| Sand | 10 | 20 |
| pH Adjust Chromic Acid | 0.5 | 2 |
| Sand | 10 | 25 |
| Mergal AntiMicrobial | 0.5 | 3 |
| RAS | 5 | 35 |

Cutback Roof Coating Composition Examples

One or more cutback ground scrap asphalt shingle roof coating products include a solvent to make the composition liquid at room temperatures, fibers, surfactants, clay, thixotropic agents, pigments, polymers and/or polymer dispersion, and other additives. In various embodiments, the solvent may be mineral spirits (a petroleum distillate) and/or petroleum naptha, but other solvents are possible. The fiber used in these compositions are generally cellulose, but may also include glass fiber.

The recycled asphalt shingle scrap may result in a roof coating or pavement sealer product that is black enough in color, to eliminate or reduce the use of an additional black colorant in the coating product. Generally speaking, it may be desirable for some uses of a roof coating or pavement sealer product to have a coating that is blacker in color.

An example RAS asphalt roof cement composition of matter may include:

| Roof Cement | Range % By Wt. | |
| --- | --- | --- |
| Asphalt Cutback | 65 | 85 |
| PA-14 Acetate (surfactant) | 0 | 5 |
| Clay | 2 | 15 |
| Fatty Acid (Wetting agent) | 0 | 5 |
| Fiber | 1 | 15 |
| Water | 0 | 10 |
| Barnett Clay (Filler) | 0 | 15 |
| RAS | 0 | 30 |

An example asphalt coating or adhesive composition of matter may include:

| Roof Coating/Adhesive | Range % by Wt. | |
| --- | --- | --- |
| Cutback | 85 | 95 |
| PA-14 Acetate | 0 | 5 |
| Attagel 15 | 2 | 10 |
| Fiber | 1 | 5 |
| RAS | 0 | 20 |

Example aluminum roof coating compositions of matter with RAS may include:

| SOLVENT Aluminum | Range % by Wt. | |
| --- | --- | --- |
| Mineral Spirits | 10 | 35 |
| Cutback (75%) | 35 | 65 |
| H 108 Rubber Soln (20%) | 0 | 10 |
| Harborlite Perlite | 0 | 15 |
| G 66 Fiber (Cellulose) | 0 | 10 |
| Micro-sorb (used to absorb moisture) | 0.2 | 3 |
| AL Paste | 5 | 15 |
| RAS | 2 | 40 |

Example water based aluminum roof coating compositions of matter may include:

| WATER BASED Aluminum | Range % by Wt. | |
| --- | --- | --- |
| Water | 50 | 65 |
| Aluminum Paste | 5 | 20 |
| Tylose | 0 | 2 |
| Mergal | 0 | 2 |
| Imsil Silica | 5 | 20 |
| Acrysol ASE-95NP (Acrylic Thickner) | 0 | 2 |
| Asphalt | 5 | 20 |
| Bentonite | 0.2 | 2 |
| Chromic Acid | 0 | 0.5 |
| Harmonite RAS | 0 | 20 |

An example asphalt roof cement composition of matter with RAS may include:

| Roof Cement (With water) | Range % by Wt. | |
| --- | --- | --- |
| Bentonite clay and water | 25 | 60 |
| Asphalt Cutback 75% | 25 | 60 |
| PA-14 | 0.1 | 2 |
| AFT Fiber | 0.5 | 8 |
| Mergal | 0.1 | 1 |
| RAS | 0 | 50 |

An example RAS roof cement composition of matter may include:

| Roof Cement | Range % by Wt. | |
| --- | --- | --- |
| Asphalt Cutback | 65 | 85 |
| PA-14 | 0 | 5 |
| Clay | 2 | 15 |
| Fatty Acid (Wetting agent) | 0 | 5 |
| Fiber | 1 | 15 |
| Water | 0 | 10 |
| Barnett Clay (Filler) | 0 | 15 |
| RAS | 0 | 30 |

Roof coating compositions of matter may be used in various applications, such as but not limited to, driveway sealers, asphalt based coatings and mastics used in roofing, waterproofing and damp proofing, and as other roof coating products as well as pavement sealing products.

Throughout this specification, the term process may, depending at least in part upon the particular context, be understood to include any method, process, apparatus, and/or other patentable subject matter that implements the subject matter disclosed herein.

It will, of course, be understood that, although particular embodiments have just been described, the claimed subject matter is not limited in scope to a particular embodiment or implementation. For example, one embodiment may be in a composition of matter, and another may be a process for making a composition of matter, such as implemented to operate on a device or combination of devices, for example, whereas another embodiment may be in a product made by a particular process and another embodiment may be in a product that is a composition of matter that may be made by multiple various methods and/or apparatuses. Likewise, an embodiment may be implemented any combination of compositions of matter, apparatuses, methods or products made by a process, for example.

In the preceding description, various aspects of claimed subject matter have been described. For purposes of explanation, specific numbers, percentages, components, ingredients and/or configurations were set forth to provide a thorough understanding of claimed subject matter. However, it should be apparent to one skilled in the art having the benefit of this disclosure that claimed subject matter may be practiced without the specific details. In other instances, features that would be understood by one of ordinary skill were omitted or simplified so as not to obscure claimed subject matter. While certain features and embodiments have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A roof coating composition of matter comprising:
an asphalt cutback;
one or more scrap asphalt shingles that have been dry ground into a powder comprising an amount substantially in the range of 2-50% by weight of the composition and particles substantially within the range of 10-40 mesh size;
a solvent capable of dissolving the roof coating into a liquid at one or more room temperatures;
a thickener capable of changing a viscosity of said composition of matter; and
one or more fillers.

2. The composition of claim 1 wherein said powder has a screen size of approximately 0.0331 in or 0.841 mm and a moisture content substantially in the range of 1-5%.

3. The composition of claim 1 wherein the scrap asphalt shingles have been ground into a particle size of a maximum of approximately 20 mesh.

4. The composition of claim 1 wherein the scrap asphalt shingles have been ground into a particle size of approximately 98 percent 20 mesh.

5. The composition of claim 1 wherein the scrap shingles are ground by a double hammer mill.

6. The composition of claim 1 wherein said scrap shingles have been ground into a 20 mesh dry powder without adding heat.

7. The composition of claim 1 wherein said scrap shingles have been ground into a dry powder without adding liquid to said shingles.

8. The composition of claim 1 wherein said fillers comprise fibers.

9. The composition of claim 1 wherein said thickener comprises one or more clays.

10. The roof coating composition of matter of claim 1, the scrap asphalt shingles that have been dry ground into a powder comprising an amount substantially 20% by weight of the composition.

11. The roof coating composition of matter of claim 1, the scrap asphalt shingles that have been dry ground into a powder comprising an amount substantially 30% by weight of the composition.

12. The roof coating composition of matter of claim 1, the scrap asphalt shingles that have been dry ground into a powder comprising an amount substantially 40% by weight of the composition.

13. The roof coating composition of matter of claim 1, the scrap asphalt shingles that have been dry ground into a powder comprising an amount substantially 2% by weight of the composition.

14. The roof coating composition of matter of claim 1, the scrap asphalt shingles that have been dry ground into a powder comprising an amount substantially 50% by weight of the composition.

15. A roof coating composition of matter comprising:
one or more scrap asphalt shingles that have been dry ground into a powder comprising an amount substantially in the range of 5-35% by weight of the composition and a mesh size of substantially 10-40 mesh;
asphalt;
water;
a stabilizer;
an emulsifier; and
an antimicrobial agent.

16. The composition of claim 15 wherein said powder has a screen size of approximately 0.0331 in or 0.841 mm and a moisture content substantially in the range of 1-5%.

17. The composition of claim 15 wherein the scrap asphalt shingles have been ground into a particle size of a maximum of approximately 20 mesh.

18. The composition of claim 15 wherein the scrap asphalt shingles have been ground into a particle size of substantially 98 percent 20 mesh.

19. The composition of claim 15 wherein the scrap shingles are ground by a double hammer mill.

20. The composition of claim 15 wherein said scrap shingles have been ground into a dry powder without adding heat.

21. The composition of claim 15 wherein said scrap shingles have been ground into a dry powder without adding liquid to said shingles.

22. The composition of claim 15 further comprising fibers.

23. The composition of claim 15 wherein said emulsifier comprises chromic acid.

24. The composition of claim 15 wherein said stabilizer comprises one or more clays.

25. The composition of claim 15 wherein said water is in a maximum amount of substantially 55% by weight of said composition.

26. The roof coating composition of matter of claim 15, the scrap asphalt shingles that have been dry ground into a powder comprising an amount of substantially 5% by weight of the composition.

27. The roof coating composition of matter of claim 15, the scrap asphalt shingles that have been dry ground into a powder comprising an amount of substantially 20% by weight of the composition.

28. The roof coating composition of matter of claim 15, the scrap asphalt shingles that have been dry ground into a powder comprising an amount of substantially 35% by weight of the composition.

29. A roof coating composition of matter comprising an asphalt cutback and recycled scrap asphalt shingles made by the process of:
    grinding said recycled scrap asphalt shingles in a double hammer mill into a dry powder having a screen size substantially in the range of 10-40 mesh;
    post adding said dry powder in an amount substantially in the range of 2-50% by weight of the composition to a liquid mixture comprising an asphalt, a solvent, a thickener and a filler.

30. The roof coating composition of claim 29 wherein said dry powder comprises a maximum amount of substantially 20% by weight of the composition.

31. The roof coating composition of claim 29 wherein said recycled asphalt shingles are dry ground in said double hammer mill without adding heat or water.

32. The roof coating composition of claim 29 wherein said dry powder has a maximum moisture content of substantially 5%.

33. The roof coating composition of claim 29 wherein said solvent comprises mineral spirits, said thickener comprises clay and said filler comprises fiber.

34. The roof coating composition of claim 33 wherein said liquid mixture further comprises a surfactant.

35. The roof coating composition of claim 29, the scrap asphalt shingles that have been dry ground into a powder comprising an amount of substantially 30% by weight of the composition.

36. The roof coating composition of claim 29, the scrap asphalt shingles that have been dry ground into a powder comprising an amount of substantially 40% by weight of the composition.

37. The roof coating composition of claim 29, the scrap asphalt shingles that have been dry ground into a powder comprising an amount of substantially 50% by weight of the composition.

38. The roof coating composition of claim 29, the scrap asphalt shingles that have been dry ground into a powder comprising an amount of substantially 2% by weight of the composition.

39. The roof coating composition of claim 29, the scrap asphalt shingles that have been dry ground into a powder having a particle size of approximately 10 mesh.

40. The roof coating composition of claim 29, the scrap asphalt shingles that have been dry ground into a powder having a particle size of approximately 20 mesh.

41. A method of making an asphalt cutback roof coating, comprising:
    grinding recycled scrap asphalt single into a dry power substantially within the range of 10-40 mesh size in a double hammer mill without adding heat or liquid to the scrap asphalt single during grinding; and
    adding the dry power into a liquid mixture comprising an asphalt cutback, a solvent, a stabilizer, and a filler.

42. The method of claim 41 further comprising:
    post adding said dry power to said liquid mixture after said mixture is combined.

43. The method of claim 41 wherein said dry power is grounded into a particle size of substantially within the range of 20-30 mesh.

44. The method of claim 41 wherein said ground recycled scrap asphalt shingle comprises substantially in the range of 2-50% by weight of the roof coating.

45. The method of claim 41 wherein said filler comprises one or more fibers in an amount substantially in the range of 1-5% by weight of said composition.

46. The method of claim 41 wherein said filler comprises one or more clays in an amount substantially in the range of 2-10% by weight of said composition.

47. The method of claim 41 wherein said filler comprises one or more clays in an amount substantially in the range of 6-25% by weight of said composition.

48. The method of claim 41 and said dry power is grounded into a particle size of approximately 10 mesh.

49. The method of claim 41 and said dry power is grounded into a particle size of approximately 20 mesh.

50. The method of claim 41 and said dry power is grounded into a particle size of approximately 30 mesh.

51. The method of claim 41 wherein said ground recycled scrap asphalt shingle comprises approximately 2% by weight of the roof coating.

52. The method of claim 41 wherein said ground recycled scrap asphalt shingle comprises approximately 20% by weight of the roof coating.

53. The method of claim 41 wherein said ground recycled scrap asphalt shingle comprises approximately 30% by weight of the roof coating.

54. The method of claim 41 wherein said ground recycled scrap asphalt shingle comprises approximately 40% by weight of the roof coating.

55. The method of claim 41 wherein said ground recycled scrap asphalt shingle comprises approximately 50% by weight of the roof coating.

56. A roof cement composition of matter comprising:
    an asphalt cutback in an amount substantially within the range of 65-85% by weight of the composition;
    one or more surfactants in a maximum amount of substantially 5% by weight of the composition;

one or more clays in an amount of substantially in the range of 2-30% by weight of the composition;
one or more wetting agents in a maximum amount of substantially 5% by weight of the composition;
one or more fibers in an amount of substantially in the range of 1-15% by weight of the composition;
an amount of water in a maximum amount of substantially 10% by weight of the composition; and
one or more recycled asphalt scrap shingles dry ground into a powder in a double hammer mill without adding heat or water, wherein said dry powder has a particle size of substantially within the range of 10-40 mesh, and is in an amount of substantially in the range of 2-30% by weight of the composition.

57. The composition of claim 56 wherein said recycled asphalt scrap shingles are post added to said composition.

58. The roof coating adhesive composition of matter of claim 56, the scrap asphalt shingles that have been dry ground into a powder comprise substantially 30% by weight of the composition.

59. A roof cement composition of matter comprising:
drilling fluid in an amount substantially in the range of 25-60% by weight of the composition;
an asphalt cutback in an amount of substantially in the range of 25-60% by weight of the composition;
one or more surfactants in an amount of substantially in the range of 0.1-2% by weight of the composition;
one or more fibers in an amount of substantially in the range of 0.5-8% by weight of the composition;
one or more anti-microbial agents in an amount of substantially in the range of 0.1-1% by weight of the composition; and
one or more recycled asphalt scrap shingles dry ground into a powder of a particle size of substantially within the range of 10-40 mesh, and in an amount of substantially in the range of 2-50% by weight of the composition.

60. The composition of claim 59 wherein said recycled asphalt scrap shingles are dry ground without adding heat or liquid and post added to said composition.

61. The roof cement composition of matter of claim 59, the recycled asphalt scrap shingles dry ground into a powder comprise substantially 50% by weight of the composition.

62. A roof cement composition of matter comprising:
an asphalt cutback in an amount of substantially in the range of 65-85% by weight of the composition;
one or more surfactants in an amount of a maximum of substantially 5% by weight of the composition;
one or more clays in an amount of substantially in the range of 2-30% by weight of the composition;
one or more fibers in an amount of substantially in the range of 1-15% by weight of the composition;
a wetting agent in an amount of a maximum of substantially 5% by weight of the composition;
an amount of water in an amount of a maximum of substantially 10% by weight of the composition; and
one or more recycled asphalt scrap shingles dry ground into a powder of a particle size of substantially within the range of 10-40 mesh, and in an amount of substantially in the range of 2-30% by weight of the composition.

63. The composition of claim 62 wherein said recycled asphalt scrap shingles are dry ground without adding heat or liquid and post added to said composition.

64. The roof cement composition of matter of claim 62, the recycled asphalt scrap shingles dry ground into a powder comprise substantially 30% by weight of the composition.

65. A roof coating composition of matter comprising:
an amount of asphalt substantially in the range of 30-50% by weight of the composition;
an amount of water substantially in the range of 40-55% by weight of the composition;
one or more clays substantially in the range of 5-25% by weight of the composition;
one or more chromic acids substantially in the range of 0.1-0.5% by weight of the composition;
one or more antimicrobial agents substantially in the range of 0.1-0.5% by weight of the composition;
one or more recycled asphalt scrap shingles in an amount of substantially in the range of 2-20% by weight of the composition; wherein said recycled scrap shingles are dry ground into a powder of a particle size substantially in the range of 10-40 mesh; and
one or more cellulose fibers in a maximum amount of substantially 4% by weight of the composition.

66. The roof coating composition of matter of claim 65, the recycled asphalt scrap shingles dry ground into a powder comprise substantially 20% by weight of the composition.

67. A roof coating adhesive composition of matter comprising:
one or more scrap asphalt shingles that have been dry ground into a powder comprising substantially 2-20% by weight of the composition and having a mesh size of substantially 10-40 mesh;
one or more solvents capable of dissolving the roof coating adhesive into a liquid at one or more room temperatures in an amount of substantially 0-5% by weight of the composition;
one or more suspension agents capable of suspending fibers in an asphalt cutback product in an amount substantially in the range of 2-10% by weight of the composition;
one or more cellulose fibers in an amount of substantially in the range of 1-5% by weight of the composition; and
an asphalt cutback in an amount substantially in the range of 85-95% by weight of the composition.

68. The roof coating adhesive composition of matter of claim 67, the recycled asphalt scrap shingles dry ground into a powder comprise substantially 20% by weight of the composition.

69. An aluminum roof coating composition of matter comprising:
an amount of water substantially in the range of 50-65% by weight of the composition;
an aluminum paste in an amount substantially in the range of 5-20% by weight of the composition;
one or more microbial agents in a maximum amount of substantially 2% by weight of the composition;
one or more emulsifiers in a maximum amount of substantially 5% by weight of the composition;
one or more stabilizers in an amount substantially in the range of 0.2-2% by weight of the composition;
one or more fillers in an amount substantially in the range of 5-20% by weight of the composition;
one or more thickening agents in a maximum amount of substantially 2% of the composition;
one or more gums in a maximum amount of substantially 2% by weight of the composition;
an amount of asphalt substantially in the range of 5-20% by weight of the composition; and
one or more recycled scrap asphalt shingles that have been dry ground into a powder of a screen size substantially within the range of 10-40 mesh, and comprising an amount of substantially in the range of 2-20% by weight of the composition.

70. The aluminum roof coating composition of matter of claim 69, the recycled asphalt scrap shingles dry ground into a powder comprise substantially 20% by weight of the composition.

71. An aluminum roof coating composition of matter comprising:
    a solvent in an amount substantially in the range of 10-35% by weight of the composition;
    an asphalt cutback in an amount of substantially in the range of 35-65% by weight of the composition;
    an aluminum paste in an amount substantially in the range of 5-15% by weight of the composition;
    one or more fibers in a maximum amount of substantially 10% by weight of the composition;
    a bonding agent in a maximum amount of substantially 10% by weight of the composition;
    a moisture absorbing agent in a maximum amount of substantially 3% by weight of the composition;
    an insulator in a maximum amount of substantially 15% by weight of the composition; and
    one or more recycled scrap asphalt shingles that have been dry ground into a powder of a maximum screen size of substantially within the range of 10-40 mesh and comprising substantially 2-40% by weight of the composition.

72. The aluminum roof coating composition of claim 71 wherein said bonding agent is comprised of a rubber solution.

73. The aluminum roof coating composition of claim 71 wherein said fibers comprise said insulator.

74. The aluminum roof coating composition of claim 71 wherein said aluminum paste may be in powder form.

75. A roof coating composition of matter comprising an emulsion and recycled scrap asphalt shingles made by the process of:
    grinding said recycled scrap asphalt shingles in a double hammer mill into a dry powder having a screen size substantially in the range of 10-40 mesh;
    post adding said dry powder in an amount substantially in the range of 5-35% by weight of the composition to a liquid mixture comprising an asphalt emulsion, a thickener and a filler.

76. The roof coating composition of claim 75 wherein said dry powder comprises an amount of substantially 5% by weight of the composition.

77. The roof coating composition of claim 75 wherein said dry powder comprises an amount of substantially 20% by weight of the composition.

78. The roof coating composition of claim 75 wherein said dry powder comprises an amount of substantially 35% by weight of the composition.

79. The roof coating composition of claim 75 wherein said recycled asphalt shingles are dry ground in said double hammer mill without adding heat or water.

80. The roof coating composition of claim 75 wherein said dry powder has a maximum moisture content of substantially 5%.

81. The roof coating composition of claim 75 wherein said thickener comprises clay, said filler comprises cellulose fiber; and wherein said liquid mixture further comprises an antimicrobial and an emulsifier.

82. The roof coating composition of claim 75, the scrap asphalt shingles that have been dry ground into a powder having a particle size of approximately 10 mesh.

83. The roof coating composition of claim 75, the scrap asphalt shingles that have been dry ground into a powder having a particle size of approximately 20 mesh.

84. A method of making an asphalt emulsion roof coating, comprising:
    grinding recycled scrap asphalt single into a dry power substantially within the range of 10-40 mesh size in a double hammer mill without adding heat or liquid to the scrap asphalt single during grinding; and
    adding the dry power into a liquid mixture comprising an asphalt emulsion, a solvent, a stabilizer, and a filler.

85. The method of claim 84 further comprising post adding said dry power to said liquid mixture after said mixture is combined.

86. The method of claim 84 and said dry power is grounded into a particle size of substantially within the range of 20-30 mesh.

87. The method of claim 84 and said ground recycled scrap asphalt shingle comprises substantially in the range of 2-50% by weight of the roof coating.

88. The method of claim 84 and said filler comprises one or more fibers in an amount substantially in the range of 1-5% by weight of said composition.

89. The method of claim 84 and said emulsifier comprises water in an amount substantially in the range of 40-55% by weight of said composition, said liquid solution further comprises an emulsifier in an amount substantially within the range of 0.1-0.5% by weight of said composition.

90. The method of claim 84 and said filler comprises one or more clays in an amount substantially in the range of 6-25% by weight of said composition.

91. The method of claim 84 and said dry power is grounded into a particle size of approximately 10 mesh.

92. The method of claim 84 and said dry power is grounded into a particle size of approximately 20 mesh.

93. The method of claim 84 and said ground recycled scrap asphalt shingle comprises approximately 5% by weight of the roof coating.

94. The method of claim 84 and said ground recycled scrap asphalt shingle comprises approximately 20% by weight of the roof coating.

95. The method of claim 84 and said ground recycled scrap asphalt shingle comprises approximately 35% by weight of the roof coating.

* * * * *